United States Patent
Zhao

(10) Patent No.: US 12,550,223 B2
(45) Date of Patent: Feb. 10, 2026

(54) DISCONTINUOUS RECEPTION TIMER MAINTENANCE METHOD AND USER EQUIPMENT

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 711 days.

(21) Appl. No.: 17/798,509

(22) PCT Filed: Dec. 28, 2020

(86) PCT No.: PCT/CN2020/139954
§ 371 (c)(1),
(2) Date: Aug. 9, 2022

(87) PCT Pub. No.: WO2021/159870
PCT Pub. Date: Aug. 19, 2021

(65) Prior Publication Data
US 2023/0140680 A1 May 4, 2023

(30) Foreign Application Priority Data
Feb. 10, 2020 (CN) .......................... 202010085289.7

(51) Int. Cl.
*H04W 76/28* (2018.01)
*H04L 1/1812* (2023.01)
*H04W 92/18* (2009.01)

(52) U.S. Cl.
CPC .......... *H04W 76/28* (2018.02); *H04L 1/1812* (2013.01); *H04W 92/18* (2013.01)

(58) Field of Classification Search
None
See application file for complete search history.

(56) References Cited

U.S. PATENT DOCUMENTS

| 2015/0098414 | A1 | 4/2015 | Kuo |
| 2017/0339682 | A1* | 11/2017 | Lee .......................... H04L 1/188 |
| 2018/0110085 | A1 | 4/2018 | Tseng |
| 2019/0098689 | A1 | 3/2019 | Wei et al. |
| 2019/0174411 | A1 | 6/2019 | Xu et al. |
| 2020/0275474 | A1* | 8/2020 | Chen ...................... H04L 1/1607 |
| 2020/0344722 | A1* | 10/2020 | He ......................... H04W 72/02 |

(Continued)

FOREIGN PATENT DOCUMENTS

| CN | 101635615 A | 1/2010 |
| CN | 108307486 A | 7/2018 |

(Continued)

OTHER PUBLICATIONS

The Extended European Search Report for the corresponding European Patent Application No. 20919277.2 issued by the European Patent Office on Jul. 7, 2023.

(Continued)

*Primary Examiner* — Kodzovi Acolatse
(74) *Attorney, Agent, or Firm* — Ladas & Parry, LLP

(57) ABSTRACT

The present disclosure provides a DRX maintenance method and a UE, and it relates to the field of communication technology. The DRX timer maintenance method applied for the UE includes, with respect to a sidelink interface, managing a timer corresponding to a first HARQ process in accordance with a cast type corresponding to the first HARQ process.

16 Claims, 3 Drawing Sheets

(56) References Cited

U.S. PATENT DOCUMENTS

| | | | | |
|---|---|---|---|---|
| 2020/0396024 A1* | 12/2020 | Ganesan | ............... | H04L 1/1896 |
| 2021/0227602 A1* | 7/2021 | Li | ..................... | H04W 76/14 |
| 2021/0297842 A1 | 9/2021 | Shrivastava | | |
| 2022/0159679 A1* | 5/2022 | Park | ..................... | H04W 4/46 |
| 2022/0217768 A1* | 7/2022 | Liu | ..................... | H04L 1/1874 |
| 2022/0312241 A1* | 9/2022 | Xu | ..................... | H04L 1/1883 |
| 2022/0369417 A1* | 11/2022 | Park | .................. | H04W 52/0258 |
| 2023/0052102 A1* | 2/2023 | Park | .................. | H04W 72/1263 |
| 2023/0107246 A1* | 4/2023 | Kang | .................. | H04W 52/02 |
| | | | | 370/329 |
| 2023/0164768 A1* | 5/2023 | Park | .................. | H04W 76/28 |
| | | | | 370/329 |

FOREIGN PATENT DOCUMENTS

| | | |
|---|---|---|
| CN | 108377177 A | 8/2018 |
| CN | 109479189 A | 3/2019 |
| CN | 110475391 A | 11/2019 |
| CN | 110708145 A | 1/2020 |
| EP | 3855860 A1 | 7/2021 |
| EP | 4057679 A1 | 9/2022 |
| EP | 4074135 A1 | 10/2022 |
| EP | 4084513 A1 | 11/2022 |
| WO | 2021119474 A1 | 6/2021 |

OTHER PUBLICATIONS

"Discussion on HARQ support for NR sidelink," 3GPP TSG-RAN WG2 #108, R2-1915968, Reno, USA, Nov. 18-22, 2019, Agenda Item: 6.4.2, Source: Huawei, HiSilicon, all pages.

First Japanese Office Action for the corresponding Japanese Patent Application No. 2022-548681 issued by the Japanese Patent Office on Aug. 8, 2023, and its English translation provided by foreign associate.

"The operation of UL HARQ RTT Timer for UL LAA," 3GPP TSG-RAN2 Meeting #96, R2-168444, US, Reno, Nevada Nov. 14-18, 2016, Agenda Item: 8.1.2—Enhanced LAA for LTE User plane, Source: ASUSTek, all pages.

"New WID on NR sidelink enhancement," 3GPP TSG RAN Meeting #86, RP-193231, Stiges, Spain, Dec. 9-12, 2019, Source: LG Electronics, Agenda Item: 9.1.1, all pages.

International Preliminary Report on Patentability for PCT/CN2020/139954 issued on Aug. 11, 2022, and its English Translation provided by WIPO.

First Office Action and search report for Chinese Patent Application 202010085342.3, issued on Apr. 12, 2022, and its English Translation provided by Global Dossier.

"Discussion and Decision" 3GPP TSG-RAN WG2#107bis: R2-1913701, Chongqing, China, Oct. 14-18, 2019, Agenda Item: 6.4.2, Source: Huawei, HiSilicon.

International Search Report for PCT/CN2020/139954 ssued on Mar. 25, 2021, and its English Translation provided by WIPO.

Written Opinion for PCT/CN2020/139954 issued on Mar. 25, 2021, and its English Translation provided by WIPO.

First Office Action and search report for Chinese Patent Application 202010085289.7 issued on Nov. 26, 2021, and its English Translation provided by Global Dossier.

"Discussion on HARQ support for NR sidelink," 3GPP TSG-RAN WG2#107bis: R2-1913701, Chongqing, China, Oct. 14-18, 2019, Agenda Item: 6.4.2, Source: Huawei, HISilicon, all pages.

* cited by examiner with respect to a sidelink interface, managing a timer corresponding to a first HARQ process in accordance with a transmission type corresponding to the first HARQ process — 41

DISCONTINUOUS RECEPTION TIMER MAINTENANCE METHOD AND USER EQUIPMENT

CROSS-REFERENCE TO RELATED APPLICATIONS

This application is the U.S. national phase of PCT Application No. PCT/CN2020/139954 filed on Dec. 28, 2020, which claims a priority of the Chinese patent application No. 202010085289.7 filed on Feb. 10, 2020, the disclosures of which are incorporated herein by reference in their entireties.

TECHNICAL FIELD

The present disclosure relates to the field of communication technology, in particular to a Discontinuous Reception (DRX) timer maintenance method and a User Equipment (UE).

BACKGROUND

Currently, a sidelink interface does not support any power-saving mechanism, so the power consumption of a UE is relatively large and a user experience is adversely affected. A DRX configuration for the sidelink interface needs to be introduced. DRX in a current radio communication system is merely adapted to an interface between the UE and a network (i.e., a Uu interface), and there is no DRX mechanism for the sidelink interface, i.e., it is impossible to reduce the power consumption of the sidelink interface. When it is necessary to introduce a power-saving mechanism for the sidelink interface, as a possible mode, the DRX mechanism is introduced for the sidelink interface. However, currently there is no disclosed scheme about how to achieve the DRX in the sidelink interface.

SUMMARY

An object of the present disclosure is to provide a DRX timer maintenance method and a UE, so as to solve the problem in the related art where it is impossible to reduce the power consumption of the sidelink interface due to the absence of the DRX mechanism for the sidelink interface.

In one aspect, the present disclosure provides in some embodiments a DRX timer maintenance method for a UE, including, with respect to a sidelink interface, managing a timer corresponding to a first Hybrid Automatic Repeat reQuest (HARQ) process in accordance with a cast type corresponding to the first HARQ process.

In a possible embodiment of the present disclosure, in the case that the cast type is broadcast, the managing the timer corresponding to the first HARQ process in accordance with the cast type corresponding to the first HARQ process includes not maintaining, by the UE, the timer corresponding to the first HARQ process.

In a possible embodiment of the present disclosure, in the case that the cast type is groupcast or unicast, the managing the timer corresponding to the first HARQ process in accordance with the cast type corresponding to the first HARQ process includes one of: not maintaining, by the UE, the timer corresponding to the first HARQ process; maintaining, by the UE, the timer corresponding to the first HARQ process when a Transport Block (TB) corresponding to the first HARQ process needs to perform HARQ feedback, otherwise not maintaining, by the UE, the timer corresponding to the first HARQ process; or maintaining, by the UE, the timer corresponding to the first HARQ process.

In a possible embodiment of the present disclosure, in the case that the cast type is groupcast and data transmission is performed by the UE using the first HARQ process, the maintaining, by the UE, the timer corresponding to the first HARQ process when the TB corresponding to the first HARQ process needs to perform the HARQ feedback includes one of: starting, by the UE, an HARQ round-trip time timer corresponding to the first HARQ process corresponding to a Physical Sidelink Shared Channel (PSSCH) after the UE has transmitted the PSSCH, and when at least one HARQ feedback received by the UE from the other UE with respect to the first HARQ process is an HARQ Negative Acknowledgement (NACK) when the HARQ round-trip time timer expires, starting, by the UE, an HARQ retransmission timer corresponding to the first HARQ process after the HARQ round-trip time timer corresponding to the first HARQ process expires; or starting, by the UE, the HARQ round-trip time timer corresponding to the first HARQ process after the UE has transmitted the PSSCH, and starting the HARQ retransmission timer corresponding to the first HARQ process after the HARQ round-trip time timer corresponding to the first HARQ process expires.

In a possible embodiment of the present disclosure, in the case that the cast type is groupcast and data reception is performed by the UE using the first HARQ process, the maintaining, by the UE, the timer corresponding to the first HARQ process when the TB corresponding to the first HARQ process needs to perform the HARQ feedback includes one of: starting, by the UE, an HARQ round-trip time timer corresponding to the first HARQ process after the UE has received data carried in the first HARQ process and has performed the HARQ feedback, and when the HARQ feedback corresponding to the first HARQ process is an HARQ NACK, starting, by the UE, an HARQ retransmission timer corresponding to the first HARQ process after the HARQ round-trip time timer corresponding to the first HARQ process expires; or starting, by the UE, the HARQ round-trip time timer corresponding to the first HARQ process after the UE has received the data carried in the first HARQ process and has performed the HARQ feedback, and starting, by the UE, the HARQ retransmission timer corresponding to the first HARQ process after the HARQ round-trip time timer corresponding to the first HARQ process expires.

In a possible embodiment of the present disclosure, in the case that the UE starts the HARQ round-trip time timer corresponding to the first HARQ process after the UE has received the data carried in the first HARQ process and performs the HARQ feedback and the UE starts the HARQ retransmission timer corresponding to the first HARQ process after the HARQ round-trip time timer corresponding to the first HARQ process expires, the DRX timer maintenance method further includes stopping, by the UE, the HARQ retransmission timer when the UE fails to receive retransmission schedule with respect to the first HARQ process within a first predetermined time T during the operation of the HARQ retransmission timer, and the first predetermined time T is smaller than a timing length of the HARQ retransmission timer.

In a possible embodiment of the present disclosure, in the case that the cast type is unicast and data transmission is performed by the UE using the first HARQ process, the maintaining, by the UE, the timer corresponding to the first HARQ process when the TB corresponding to the first HARQ process needs to perform the HARQ feedback includes starting, by the UE, an HARQ round-trip time timer corresponding to the first HARQ process corresponding to a PSSCH after the UE has transmitted the PSSCH, and when an HARQ feedback received by the UE from a unicast correspondent node with respect to the first HARQ process is an HARQ NACK when the HARQ round-trip time timer expires, starting, by the UE, an HARQ retransmission timer corresponding to the first HARQ process after the HARQ round-trip time timer corresponding to the first HARQ process expires.

In a possible embodiment of the present disclosure, in the case that the cast type is unicast and data reception is performed by the UE using the first HARQ process, the maintaining, by the UE, the timer corresponding to the first HARQ process when the TB corresponding to the HARQ process needs to perform the HARQ feedback includes starting, by the UE, an HARQ round-trip time timer corresponding to the first HARQ process after the UE has received data carried in the first HARQ process and has performed the HARQ feedback, and when the HARQ feedback corresponding to the first HARQ process is an HARQ NACK, starting, by the UE, an HARQ retransmission timer corresponding to the first HARQ process after the HARQ round-trip time timer corresponding to the first HARQ process expires.

In a possible embodiment of the present disclosure, the maintaining, by the UE, the timer corresponding to the first HARQ process in the case that the data transmission is performed by the UE using the first HARQ process includes starting, by the UE, an HARQ retransmission timer corresponding to the first HARQ process corresponding to a PSSCH after the UE has transmitted the PSSCH.

In a possible embodiment of the present disclosure, the maintaining, by the UE, the timer corresponding to the first HARQ process in the case that the data reception is performed by the UE using the first HARQ process includes starting, by the UE, an HARQ retransmission timer corresponding to the first HARQ process after the UE has received data carried in the first HARQ process.

In another aspect, the present disclosure provides in some embodiments a UE, including a memory, a processor, and a program stored in the memory and executed by the processor. The processor is configured to execute the program so as to, with respect to a sidelink interface, managing a timer corresponding to a first HARQ process in accordance with a cast type corresponding to the first HARQ process.

In a possible embodiment of the present disclosure, in the case that the cast type is broadcast, when managing the timer corresponding to the first HARQ process in accordance with the cast type corresponding to the first HARQ process, the processor is further configured to execute the program so as to not maintain the timer corresponding to the first HARQ process.

In a possible embodiment of the present disclosure, in the case that the cast type is groupcast or unicast, when managing the timer corresponding to the first HARQ process in accordance with the cast type corresponding to the first HARQ process, the processor is further configured to execute the program so as to perform one of: not maintaining the timer corresponding to the first HARQ process; maintaining the timer corresponding to the first HARQ process when a TB corresponding to the first HARQ process needs to perform HARQ feedback, otherwise not maintaining the timer corresponding to the first HARQ process; or maintaining the timer corresponding to the first HARQ process.

In a possible embodiment of the present disclosure, in the case that the cast type is groupcast and data transmission is performed by the UE using the first HARQ process, when maintaining the timer corresponding to the first HARQ process when the TB corresponding to the first HARQ process needs to perform the HARQ feedback, the processor is further configured to execute the program so as to perform one of: starting an HARQ round-trip time timer corresponding to the first HARQ process corresponding to a PSSCH after the UE has transmitted the PSSCH, and when at least one HARQ feedback received by the UE from the other UE with respect to the first HARQ process is an HARQ NACK when the HARQ round-trip time timer expires, starting an HARQ retransmission timer corresponding to the first HARQ process after the HARQ round-trip time timer corresponding to the first HARQ process expires; or starting the HARQ round-trip time timer corresponding to the first HARQ process after the UE has transmitted the PSSCH, and starting the HARQ retransmission timer corresponding to the first HARQ process after the HARQ round-trip time timer corresponding to the first HARQ process expires.

In a possible embodiment of the present disclosure, in the case that the cast type is groupcast and data reception is performed by the UE using the first HARQ process, when maintaining the timer corresponding to the first HARQ process when the TB corresponding to the first HARQ process needs to perform the HARQ feedback, the processor is further configured to execute the program so as to perform one of: starting an HARQ round-trip time timer corresponding to the first HARQ process after the UE has received data carried in the first HARQ process and has performed the HARQ feedback, and when the HARQ feedback corresponding to the first HARQ process is an HARQ NACK, starting an HARQ retransmission timer corresponding to the first HARQ process after the HARQ round-trip time timer corresponding to the first HARQ process expires; or starting the HARQ round-trip time timer corresponding to the first HARQ process after the UE has received the data carried in the first HARQ process and has performed the HARQ feedback, and starting the HARQ retransmission timer corresponding to the first HARQ process after the HARQ round-trip time timer corresponding to the first HARQ process expires.

In a possible embodiment of the present disclosure, in the case that the UE starts the HARQ round-trip time timer corresponding to the first HARQ process after the UE has received the data carried in the first HARQ process and performs the HARQ feedback and the UE starts the HARQ retransmission timer corresponding to the first HARQ process after the HARQ round-trip time timer corresponding to the first HARQ process expires, the processor is further configured to execute the program so as to stop the HARQ retransmission timer when the UE fails to receive retransmission schedule with respect to the first HARQ process within a first predetermined time T during the operation of the HARQ retransmission timer, and the first predetermined time T is smaller than a timing length of the HARQ retransmission timer.

In a possible embodiment of the present disclosure, in the case that the cast type is unicast and data transmission is performed by the UE using the first HARQ process, when maintaining the timer corresponding to the first HARQ process when the TB corresponding to the first HARQ process needs to perform the HARQ feedback, the processor is further configured to execute the program so as to start an HARQ round-trip time timer corresponding to the first HARQ process corresponding to a PSSCH after the UE has transmitted the PSSCH, and when an HARQ feedback received by the UE from a unicast correspondent node with respect to the first HARQ process is an HARQ NACK when the HARQ round-trip time timer expires, start an HARQ retransmission timer corresponding to the first HARQ process after the HARQ round-trip time timer corresponding to the first HARQ process expires.

In a possible embodiment of the present disclosure, in the case that the cast type is unicast and data reception is performed by the UE using the first HARQ process, when maintaining the timer corresponding to the first HARQ process when the TB corresponding to the HARQ process needs to perform the HARQ feedback, the processor is further configured to execute the program so as to start an HARQ round-trip time timer corresponding to the first HARQ process after the UE has received data carried in the first HARQ process and has performed the HARQ feedback, and when the HARQ feedback corresponding to the first HARQ process is an HARQ NACK, start an HARQ retransmission timer corresponding to the first HARQ process after the HARQ round-trip time timer corresponding to the first HARQ process expires.

In a possible embodiment of the present disclosure, when maintaining the timer corresponding to the first HARQ process in the case that the data transmission is performed by the UE using the first HARQ process, the processor is further configured to execute the program so as to start an HARQ retransmission timer corresponding to the first HARQ process corresponding to a PSSCH after the UE has transmitted the PSSCH.

In a possible embodiment of the present disclosure, when maintaining the timer corresponding to the first HARQ process in the case that the data reception is performed by the UE using the first HARQ process, the processor is further configured to execute the program so as to start an HARQ retransmission timer corresponding to the first HARQ process after the UE has received data carried in the first HARQ process.

In yet another aspect, the present disclosure provides in some embodiments a computer-readable storage medium storing therein a computer program. The computer program is executed by a processor so as to implement the above-mentioned DRX timer maintenance method.

In still yet another aspect, the present disclosure provides in some embodiments a UE, including a maintenance module configured to, with respect to a sidelink interface, manage a timer corresponding to a first HARQ process in accordance with a cast type corresponding to the first HARQ process.

The present disclosure has the following beneficial effects.

According to the embodiments of the present disclosure, the timer corresponding to the HARQ process is managed at the sidelink interface in accordance with the cast type corresponding to the HARQ process. As a result, it is able to achieve the DRX mechanism for the sidelink interface, thereby to reduce the power consumption of the sidelink interface.

DETAILED DESCRIPTION

In order to make the objects, the technical solutions and the advantages of the present disclosure more apparent, the present disclosure will be described hereinafter in a clear and complete manner in conjunction with the drawings and embodiments.

At first, some concepts involved in the embodiments of the present disclosure will be described as follows.

1. Cellular Communication System

Figure 1:
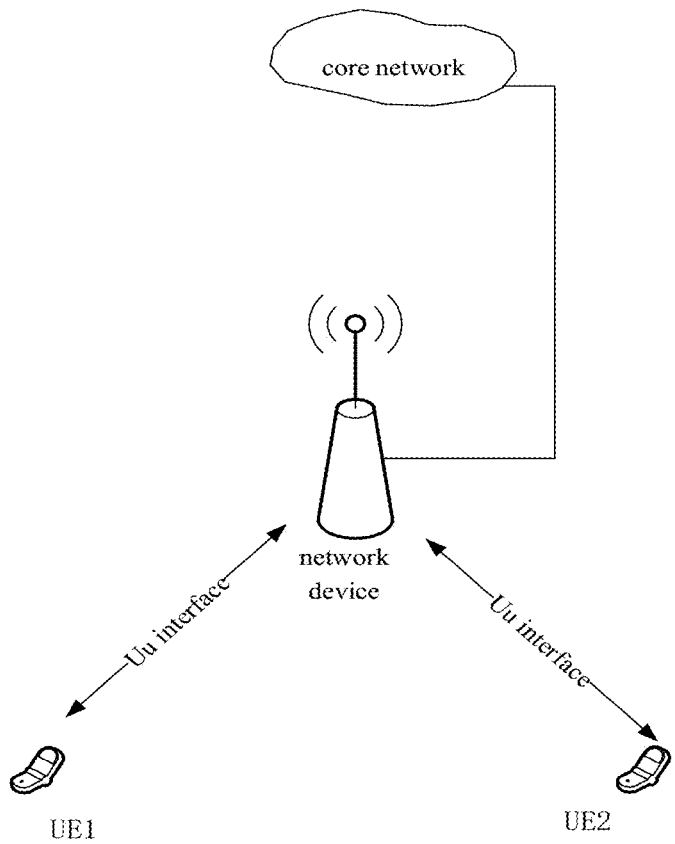
FIG. 1 is a schematic view showing a cellular communication system.

In a conventional cellular communication system, uplink/downlink data and control information are transmitted between a UE and a network side device through an interface between the UE and a network (i.e., a Uu interface), and specific network architecture is shown in FIG. 1.

2. DRX Mechanism for Cellular Communication System

In a shared channel-based mobile communication system, e.g., Long Term Evolution (LTE), a scheduler of an evolved Node B (eNB) takes charge of controlling the transmission of the uplink/downlink. When a certain user is determined to be scheduled, the scheduler notifies, through a control channel, the UE of a resource on which the data is to be transmitted or received. The UE (also called as terminal) monitors the control channel, and when scheduling information containing the UE itself has been detected, completes the transmission of the data (uplink) or the reception of the data (downlink) in accordance with an indication on the control channel. In an activated state, the UE does not know a time when it is scheduled by the eNB, so as a common operating mode, the UE continuously monitors the control channel and parses each subframe where a downlink scheduling control channel for the UE is included, so as to determine whether the UE is scheduled. High efficiency is achieved in this operating mode when a data volume for the UE is relatively large and the UE si scheduled frequently. However, for some services, a frequency of arrival of the data is relatively low, so the UE is scheduled for fewer times. When the UE still monitors the control channel continuously, the power consumption increases inevitably. In order to reduce the power consumption, a DRX operating mode is adopted by the cellular communication system, and in this mode, the UE periodically monitors the control channel for power-saving.

Figure 2:
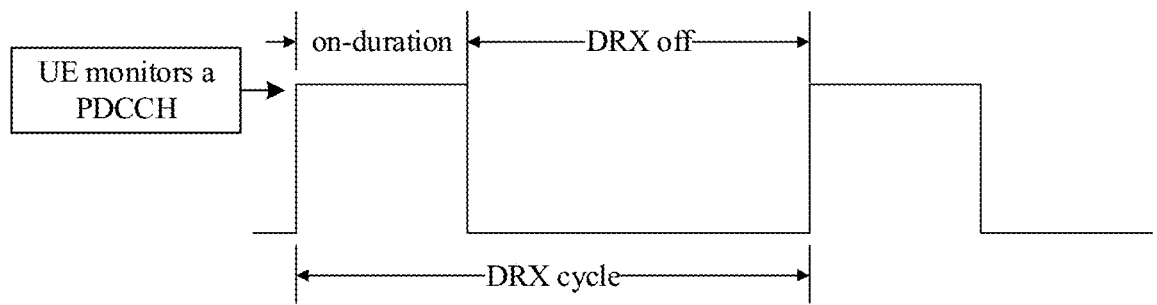
FIG. 2 is a schematic view showing a DRX process.

FIG. 2 shows a basic principle of DRX, where on-duration represents a time period in which the UE monitors the control channel, i.e., a radio frequency channel of the UE is enabled and the control channel is monitored continuously. The time period other than on-duration, the UE is in a sleep state, i.e., the radio frequency channel is disabled and the control channel is not monitored any more so as to reduce the power consumption. The on-duration occurs periodically, and a specific cycle is configured by the eNB.

An arrival model of a data service is taken into consideration in the DRX mechanism for the cellular communication system, i.e., a data packet arrives in a burst manner (it may be understood as that a plurality of data packets will arrive continuously within a short time period once one data packet has arrived). In order to be adapted to this kind of service arrival characteristic, various timers are adopted in an LTE DRX process, and the LTE DRX process is combined with an HARQ process, so as to reduce the power consumption in a better manner.

(1). DRX-Related Timers Involved in the Embodiments of the Present Disclosure

HARQ RTT timer: it includes a downlink DRX HARQ RTT timer (drx-HARQ-RTT-TimerDL) and an uplink DRX HARQ RTT timer (drx-HARQ-RTT-TimerUL), and it is used to enable the UE not to monitor the control channel when next retransmission, so as to achieve a better power-saving effect. Taking downlink as an example, when a first symbol of a relevant process for the UE is started after the transmission of a Physical Uplink Control Channel (PUCCH), the HARQ RTT timer is enabled. When the data in a corresponding HARQ process is decoded unsuccessfully after the previous HARQ transmission (an NACK is provided by the UE), a downlink DRX retransmission timer (drx-RetransmissionTimerDL) is enabled by the UE after the DL HARQ RTT timer expires. When the data in the corresponding HARQ process is decoded successfully after the previous HARQ transmission (an ACK is provided by the UE), drx-RetransmissionTimerDL is not enabled by the UE after drx-HARQ-RTT-TimerDL expires. When merely drx-HARQ-RTT-TimerDL operates currently, the UE does not monitor the control channel.

HARQ retransmission timer: it includes drx-RetransmissionTimerDL and drx-RetransmissionTimerUL. Taking downlink as an example, during the operation of the DL HARQ retransmission timer, the UE monitors the control channel, and waits for retransmission scheduling from the corresponding HARQ process.

3. Sidelink

Sidelink refers to a mode where data transmission is performed between neighboring UEs via a sidelink within a short range. A radio interface corresponding to Sidelink is called as sidelink interface, as shown in FIG. 3.

Currently, DRX in a radio communication system is merely adapted to a Uu interface between the UE and a network, and there is no DRX mechanism for the sidelink interface, i.e., it is impossible to reduce the power consumption of the sidelink interface. When it is necessary to introduce a power-saving mechanism for the sidelink interface, as a possible mode, the DRX mechanism is introduced for the sidelink interface. However, currently there is no disclosed scheme about how to achieve the DRX in the sidelink interface.

An object of the present disclosure is to provide a DRX timer maintenance method and a UE, so as to solve the above-mentioned problem.

Figures 3, 4:
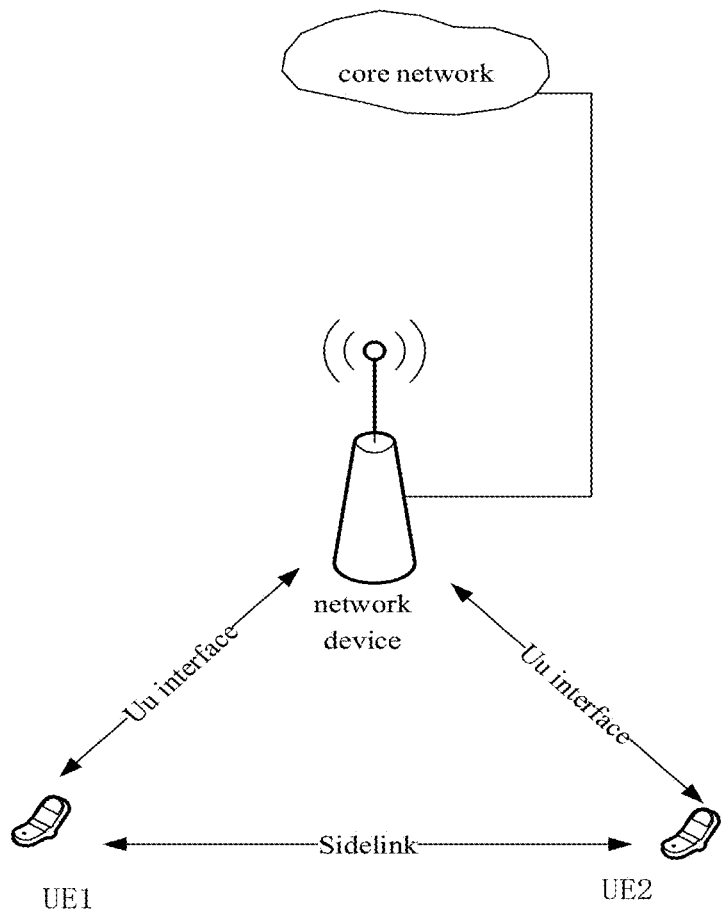
FIG. 3 is a schematic view showing network architecture for sidelink.
FIG. 4 is a flow chart of a DRX timer maintenance method according to one embodiment of the present disclosure.

As shown in FIG. 4, the present disclosure provides in some embodiments a DRX timer maintenance method for a UE, which includes Step 41 of, with respect to a sidelink interface, managing a timer corresponding to a first HARQ process in accordance with a cast type corresponding to the first HARQ process.

It should be appreciated that, in the embodiments of the present disclosure, the UE refers to a sidelink terminal for sidelink, the timer corresponding to the first HARQ process refers to an HARQ-related timer corresponding to the first HARQ process, and the first HARQ process refers to a certain HARQ process used by the UE for communication via the sidelink interface.

It should be further appreciated that, the cast types mainly include unicast, groupcast and broadcast, and processing modes of the UE are different with respect to different cast types. The following description will be given with respect to different cast types.

1. In the Case that the Cast Type is Broadcast

In this case, Step 41 specifically includes not maintaining, by the UE, the timer corresponding to the first HARQ process.

2. In the Case that the Cast Type is Groupcast

In this case, Step 41 specifically includes one of the follows.

All: not maintaining, by the UE, the timer corresponding to the first HARQ process.

In other words, with respect to a groupcast process through the sidelink interface, the UE for sidelink does not maintain the HARQ-related timer.

A12: maintaining, by the UE, the timer corresponding to the first HARQ process when a TB corresponding to the first HARQ process needs to perform HARQ feedback, otherwise not maintaining, by the UE, the timer corresponding to the first HARQ process.

It should be appreciated that, the UE in the embodiments of the present disclosure is a UE which transmits data through the sidelink interface or a UE which receives data through the sidelink interface. To be specific, in the case that the data transmission is performed by the UE through the sidelink interface using the first HARQ process, A12 includes one of the following two steps.

A121: starting, by the UE, an HARQ RTT timer corresponding to the first HARQ process corresponding to a PSSCH after the UE has transmitted the PSSCH, and when at least one HARQ feedback received by the UE from the other UE with respect to the first HARQ process is an HARQ NACK when the HARQ RTT timer expires, starting, by the UE, an HARQ retransmission timer corresponding to the first HARQ process after the HARQ RTT timer corresponding to the first HARQ process expires.

In other words, after the UE for sidelink has transmitted the PSSCH (after first repetition when the PSSCH supports repetition), the UE starts the HARQ RTT timer related to a process corresponding to the PSSCH. When the HARQ RTT timer corresponding to the process expires, when at least one HARQ NACK is received from a correspondent node with respect to the process, the UE starts the HARQ retransmission timer corresponding to the process.

A122: starting, by the UE, the HARQ RTT timer corresponding to the first HARQ process after the UE has transmitted the PSSCH, and starting the HARQ retransmission timer corresponding to the first HARQ process after the HARQ RTT timer corresponding to the first HARQ process expires.

In other words, after the UE for sidelink has transmitted the PSSCH (after first repetition when the PSSCH supports repetition), the UE starts the HARQ RTT timer related to a process corresponding to the PSSCH. When the HARQ RTT timer corresponding to the process expires, the UE starts the HARQ transmission timer corresponding to the process.

To be specific, in the case that the data reception is performed by the UE through the sidelink interface using the first HARQ process, A12 includes one of the following two steps.

A123: starting, by the UE, an HARQ round-trip time timer corresponding to the first HARQ process after the UE has received data carried in the first HARQ process and has performed the HARQ feedback, and when the HARQ feedback corresponding to the first HARQ process is an HARQ NACK, starting, by the UE, an HARQ retransmission timer corresponding to the first HARQ process after the HARQ round-trip time timer corresponding to the first HARQ process expires.

In other words, after the transmission of a Physical Sidelink Feedback Channel (PSFCH) for an HARQ process corresponding to the PSSCH, the HARQ RTT timer corresponding to the process is started. When an HARQ NACK is returned by the PSFCH, the HARQ retransmission timer corresponding to the process is started after the HARQ RTT timer corresponding to the process expires.

A124: starting, by the UE, the HARQ RTT timer corresponding to the first HARQ process after the UE has received the data carried in the first HARQ process and has performed the HARQ feedback, and starting, by the UE, the HARQ retransmission timer corresponding to the first HARQ process after the HARQ RTT timer corresponding to the first HARQ process expires.

In other words, after the transmission of the PSFCH for the HART process corresponding to the PSSCH, the HARQ RTT timer corresponding to the HARQ process is started. The HART retransmission timer corresponding to the process is always started after the HARQ RTT timer corresponding to the process expires.

Subsequent to A124, the DRX timer maintenance method in the embodiments of the present disclosure further includes stopping, by the UE, the HARQ retransmission timer when the UE fails to receive retransmission schedule with respect to the first HARQ process within a first predetermined time T during the operation of the HARQ retransmission timer, and the first predetermined time T is smaller than a timing length of the HARQ retransmission timer.

To be specific, when the UE fails to receive the retransmission schedule with respect to the HARQ process within the time period T during the operation of the HARQ retransmission timer corresponding to the process (T<=the timing length of the HARQ retransmission timer), the HARQ retransmission timer is stopped. It should be appreciated that, this step is used to optimize A123, so as to prevent the occurrence of such a situation where the HARQ retransmission timer is started by a transmitting terminal when an HARQ NACK is returned by a part of UEs, the transmitting terminal enters an active time to generate new schedule, but a receiving terminal fails to receive the new schedule.

A13: maintaining, by the UE, the timer corresponding to the first HARQ process.

It should be appreciated that, in this case, with respect to a groupcast process through the sidelink interface, the HARQ-related timer needs to be maintained no matter whether the TB needs to return the HARQ ACK/NACK. However, in this case, merely the HARQ retransmission timer is maintained by the UE.

A131: in the case that the data transmission is performed by the UE through the sidelink interface using the first HARQ process In this case, A13 specifically includes starting, by the UE, the HARQ retransmission timer corresponding to the first HARQ process after the UE has transmitted the PSSCH.

In other words, after the UE for sidelink has transmitted the PSSCH (after first repetition when the PSSCH supports repetition), the HARQ retransmission timer corresponding the process used by the PSSCH is started.

A132: in the case that the data reception is performed by the UE through the sidelink interface using the first HARQ process In this case, A13 specifically includes starting, by the UE, the HARQ retransmission timer corresponding to the first HARQ process after the UE has received the data carried in the first HARQ process.

In other words, upon the receipt of the PSSCH, the UE for sidelink starts the HARQ retransmission timer corresponding to the process.

3. In the Case that the Cast Type is Unicast

In this case, Step 41 includes one of the following steps.

B11: not maintaining, by the UE, the timer corresponding to the first HARQ process.

In other words, with respect to a unicast process through the sidelink interface, the UE for sidelink does not maintain the HARQ-related timer.

B12: when the TB corresponding to the first HARQ process needs to perform the HARQ feedback, maintaining, by the UE, the timer corresponding to the first HARQ process, otherwise, not maintaining, by the UE, the timer corresponding to the first HARQ process.

It should be appreciated that, the UE in the embodiments of the present disclosure is used to transmit data or receive data. To be specific, in the case that the data transmission is performed by the UE through the sidelink interface using the first HARQ process, B12 specifically includes starting, by the UE, the HARQ RTT timer corresponding to the first HARQ process after the UE has transmitted the PSSCH, and when the HARQ feedback received by the UE from a unicast correspondent node with respect to the first HARQ process is an HARQ NACK when the HARQ RTT timer expires, starting, by the UE, the HARQ retransmission timer corresponding to the first HARQ process after the HARQ RTT timer corresponding to the first HARQ process expires.

In other words, after the UE for sidelink has transmitted the PSSCH (after first repetition when the PSSCH supports repetition), the HARQ-RTT timer related to the process corresponding to the PSSCH is started. When the HARQ-RTT timer related to the process expires, the HARQ retransmission timer corresponding to the process is started when the HARQ NACK is received from the correspondent node.

To be specific, in the case that the data reception is performed by the UE through the sidelink interface using the first HARQ process, B12 specifically includes starting, by the UE, the HARQ RTT timer corresponding to the first HARQ process after the UE has received data carried in the first HARQ process and has performed the HARQ feedback, and when the HARQ feedback corresponding to the first HARQ process is an HARQ NACK, starting, by the UE, the HARQ retransmission timer corresponding to the first HARQ process after the HARQ RTT timer corresponding to the first HARQ process expires.

In other words, after the transmission of the PSFCH corresponding to the HARQ process corresponding to the PSSCH, the HARQ RTT timer corresponding to the process is started. When the HARQ NACK is returned by the PSFCH, the HARQ retransmission timer corresponding to the HARQ process is started after the HARQ RTT timer corresponding to the process expires.

B13: maintaining, by the UE, the timer corresponding to the first HARQ process.

It should be appreciated that, in this case, with respect to a unicast process through the sidelink interface, the HARQ-related timer needs to be maintained no matter whether the HARQ ACK/NACK is returned by the TB. However, in this case, merely the HARQ retransmission timer is maintained by the UE.

B131: in the case that the data transmission is performed by the UE through the sidelink interface using the first HARQ process In this case, B13 specifically includes starting, by the UE, the HARQ retransmission timer corresponding to the first HARQ process after the UE has transmitted the PSSCH.

In other words, after the UE for sidelink has transmitted the PSSCH (after first repetition when the PSSCH supports repetition), the HARQ retransmission timer corresponding to the PSSCH is started.

B132: in the case that the data reception is performed by the UE through the sidelink interface using the first HARQ process In this case, B13 specifically includes starting, by the UE, the HARQ retransmission timer corresponding to the first HARQ process after the UE has received the data carried in the first HARQ process.

In other words, after the UE for sidelink has received the PSSCH, the HARQ retransmission timer corresponding to the PSSCH is started.

The application of the method in the embodiments of the present disclosure will be illustratively described hereinafter.

First Example: the HARQ timer is not maintained in groupcast and broadcast, and maintained in unicast.

It is presumed that the unicast communication, the broadcast communication and the groupcast communication are performed by a UE1 simultaneously through the sidelink interface, a same HARQ entity is used by the unicast communication, the broadcast communication and the groupcast communication, and a series of parallel processes are maintained by the HARQ entity.

During the data transmission through the sidelink interface, at first the cast type corresponding to the HARQ process is determined, and then a corresponding maintenance mode is used for the HARQ-related timer in accordance with the cast type corresponding to the HARQ process.

For example, there are three processes A, B and C for the sidelink interface. When maintaining the DRX timers with respect to each process, at first it is necessary to determine a cast type corresponding to the process. When the cast type corresponding to the HARQ process A is broadcast, the cast type corresponding to the HARQ process B is groupcast and the cast type corresponding to the HARQ process C is unicast, different maintenance modes are adopted for the HARQ-related timers in accordance with the cast types corresponding to the three processes at the sidelink interface. The HARQ-related timers include the HARQ RTT timer and the HARQ retransmission timer related to the transmission through the sidelink interface.

M11: with respect to the HARQ process A, the corresponding cast type is broadcast, so it is unnecessary to maintain the HARQ-related timers with respect to the HARQ process A.

M12: with respect to the HARQ process B, the corresponding cast type is groupcast, so it is unnecessary to maintain the HARQ-related timers with respect to a TB corresponding to the HARQ process B.

M13: with respect to the HARQ process C, the corresponding cast type is unicast, so it is necessary to maintain the HARQ-related timers with respect to the HARQ process C. A specific maintenance mechanism for the HARQ-related timers will be described as follows.

M131: in the case that the data transmission is performed by the UE, the UE maintains the timers corresponding to the HARQ process as follows.

After the UE for sidelink has transmitted the PSSCH (after first repetition when the PSSCH supports repetition), the HARQ-RTT timer related to the process corresponding to the PSSCH is started. When the HARQ RTT timer related to the process expires, the HARQ retransmission timer corresponding to the process is started when the HARQ NACK is received from the correspondent node.

M132: in the case that the data reception is performed by the UE, the UE maintains the timers corresponding to the HARQ process as follows.

After the transmission of the PSFCH corresponding to the HARQ process corresponding to the PSSCH, the HARQ RTT timer corresponding to the process is started. When the HARQ NACK is returned by the PSFCH, the HARQ retransmission timer corresponding to the HARQ process is started after the HARQ RTT timer corresponding to the process expires.

Second Example: the HARQ timer is not maintained in broadcast, and maintained in groupcast and unicast.

It is presumed that the unicast communication, the broadcast communication and the groupcast communication are performed by a UE1 simultaneously through the sidelink interface, a same HARQ entity is used by the unicast communication, the broadcast communication and the groupcast communication, and a series of parallel processes are maintained by the HARQ entity.

During the data transmission through the sidelink interface, at first the cast type corresponding to the HARQ process is determined, and then a corresponding maintenance mode is used for the HARQ-related timer in accordance with the cast type corresponding to the HARQ process.

For example, there are three processes A, B and C for the sidelink interface. When maintaining the DRX timers with respect to each process, at first it is necessary to determine a cast type corresponding to the process. When the cast type corresponding to the HARQ process A is broadcast, the cast type corresponding to the HARQ process B is groupcast and the cast type corresponding to the HARQ process C is unicast, different maintenance modes are adopted for the HARQ-related timers in accordance with the cast types corresponding to the three processes at the sidelink interface. The HARQ-related timers include the HARQ RTT timer and the HARQ retransmission timer related to the transmission through the sidelink interface.

M21: with respect to the HARQ process A, the corresponding cast type is broadcast, so it is unnecessary to maintain the HARQ-related timers with respect to the HARQ process A.

M22: with respect to the HARQ process B, the corresponding cast type is groupcast, so it is necessary to maintain the HARQ-related timers with respect to a TB corresponding to the HARQ process B. A specific maintenance mechanism for the HARQ-related timers will be described as follows.

M221: in the case that the data transmission is performed by the UE, the UE maintains the timers corresponding to the HARQ process as follows.

After the UE for sidelink has transmitted the PSSCH (after first repetition when the PSSCH supports repetition), the HARQ-RTT timer related to the process corresponding to the PSSCH is started. When the HARQ RTT timer related to the process expires, the HARQ retransmission timer corresponding to the process is started when at least one HARQ NACK is received from the correspondent node with respect to the process.

M222: in the case that the data reception is performed by the UE, the UE maintains the timers corresponding to the HARQ process through the following mode a) or b).

Mode a): after the transmission of the PSFCH corresponding to the HARQ process corresponding to the PSSCH, the HARQ RTT timer corresponding to the process is started.

When the HARQ NACK is returned by the PSFCH, the HARQ retransmission timer corresponding to the process is started after the HARQ RTT timer corresponding to the process expires.

Mode b): after the transmission of the PSFCH corresponding to the HARQ process corresponding to the PSSCH, the HARQ RTT timer corresponding to the process is started. The HARQ retransmission timer corresponding to the process is always started after the HARQ RTT timer corresponding to the process expires. Further, when the retransmission schedule with respect to the HARQ process fails to be received within a time T during the operation of the HARQ retransmission timer (T is smaller than or equal to a length of the HARQ retransmission timer), the HARQ retransmission timer is stopped. This is mode is used to optimize the mode a), so as to prevent the occurrence of such a situation where the HARQ retransmission timer is started by a transmitting terminal when an HARQ NACK is returned by a part of UEs, the transmitting terminal enters an active time to generate new schedule, but a receiving terminal fails to receive the new schedule.

M23: with respect to the HARQ process C, the corresponding cast type is unicast, so it is necessary to maintain the HARQ-related timers with respect to the HARQ process C. A specific maintenance mechanism for the HARQ-related timers will be described as follows.

M231: in the case that the data transmission is performed by the UE, the UE maintains the timers corresponding to the HARQ process as follows.

After the UE for sidelink has transmitted the PSSCH (after first repetition when the PSSCH supports repetition), the HARQ-RTT timer related to the process corresponding to the PSSCH is started. When the HARQ RTT timer related to the process expires, the HARQ retransmission timer corresponding to the process is started when the HARQ NACK is received from the correspondent node.

M232: in the case that the data reception is performed by the UE, the UE maintains the timers corresponding to the HARQ process as follows.

After the transmission of the PSFCH corresponding to the HARQ process corresponding to the PSSCH, the HARQ RTT timer corresponding to the process is started. When the HARQ NACK is returned by the PSFCH, the HARQ retransmission timer corresponding to the HARQ process is started after the HARQ RTT timer corresponding to the process expires.

Third Example: the HARQ timer is not maintained in broadcast, and maintained in groupcast and unicast.

It is presumed that the unicast communication, the broadcast communication and the groupcast communication are performed by a UE1 simultaneously through the sidelink interface, a same HARQ entity is used by the unicast communication, the broadcast communication and the groupcast communication, and a series of parallel processes are maintained by the HARQ entity.

During the data transmission through the sidelink interface, at first the cast type corresponding to the HARQ process is determined, and then a corresponding maintenance mode is used for the HARQ-related timer in accordance with the cast type corresponding to the HARQ process.

For example, there are three processes A, B and C for the sidelink interface. When maintaining the DRX timers with respect to each process, at first it is necessary to determine a cast type corresponding to the process. When the cast type corresponding to the HARQ process A is broadcast, the cast type corresponding to the HARQ process B is groupcast and the cast type corresponding to the HARQ process C is unicast, different maintenance modes are adopted for the HARQ-related timers in accordance with the cast types corresponding to the three processes at the sidelink interface. The HARQ-related timers include the HARQ RTT timer and the HARQ retransmission timer related to the transmission through the sidelink interface.

M31: with respect to the HARQ process A, the corresponding cast type is broadcast, so it is unnecessary to maintain the HARQ-related timers with respect to the HARQ process A.

M32: with respect to the HARQ process B, the corresponding cast type is groupcast, so it is necessary to maintain the HARQ-related timers with respect to a TB corresponding to the HARQ process B. A specific maintenance mechanism for the timers will be described as follows.

M321: in the case that the data transmission is performed by the UE, the UE maintains the timers corresponding to the HARQ process as follows.

After the UE for sidelink has transmitted the PSSCH (after first repetition when the PSSCH supports repetition), the HARQ-RTT timer related to the process corresponding to the PSSCH is started. When the HARQ RTT timer related to the process expires, the HARQ retransmission timer corresponding to the process is started.

M322: in the case that the data reception is performed by the UE, the UE maintains the timers corresponding to the HARQ process as follows.

After the transmission of the PSFCH corresponding to the HARQ process corresponding to the PSSCH, the HARQ RTT timer corresponding to the process is started. The HARQ retransmission timer corresponding to the process is always started after the HARQ RTT timer corresponding to the process expires. Further, when the retransmission schedule with respect to the HARQ process fails to be received within a time T during the operation of the HARQ retransmission timer (T is smaller than or equal to a length of the HARQ retransmission timer), the HARQ retransmission timer is stopped.

M33: with respect to the HARQ process C, the corresponding cast type is unicast, so it is necessary to maintain the HARQ-related timers with respect to the HARQ process C. A specific maintenance mechanism for the HARQ-related timers will be described as follows.

M331: in the case that the data transmission is performed by the UE, the UE maintains the timers corresponding to the HARQ process as follows.

After the UE for sidelink has transmitted the PSSCH (after first repetition when the PSSCH supports repetition), the HARQ-RTT timer related to the process (the process C) corresponding to the PSSCH is started. When the HARQ RTT timer related to the process C expires, the HARQ retransmission timer corresponding to the process C is started when an HARQ NACK is received from the receiving terminal.

M332: in the case that the data reception is performed by the UE, the UE maintains the timers corresponding to the HARQ process as follows.

After the transmission of the PSFCH corresponding to the HARQ process C corresponding to the PSSCH, the HARQ RTT timer corresponding to the process C is started. When the HARQ NACK is returned by the PSFCH, the HARQ retransmission timer corresponding to the HARQ process C is started after the HARQ RTT timer corresponding to the process C expires.

Fourth Example: the HARQ timer is not maintained in broadcast, and maintained in groupcast and unicast.

It is presumed that the unicast communication, the broadcast communication and the groupcast communication are performed by a UE1 simultaneously through the sidelink interface, a same HARQ entity is used by the unicast communication, the broadcast communication and the groupcast communication, and a series of parallel processes are maintained by the HARQ entity.

During the data transmission through the sidelink interface, at first the cast type corresponding to the HARQ process is determined, and then a corresponding maintenance mode is used for the HARQ-related timer in accordance with the cast type corresponding to the HARQ process.

For example, there are three processes A, B and C for the sidelink interface. When maintaining the DRX timers with respect to each process, at first it is necessary to determine a cast type corresponding to the process. When the cast type corresponding to the HARQ process A is broadcast, the cast type corresponding to the HARQ process B is groupcast and the cast type corresponding to the HARQ process C is unicast, different maintenance modes are adopted for the HARQ-related timers in accordance with the cast types corresponding to the three processes at the sidelink interface. The HARQ-related timers include the HARQ RTT timer and the HARQ retransmission timer related to the transmission through the sidelink interface.

M41: with respect to the HARQ process A, the corresponding cast type is broadcast, so it is unnecessary to maintain the HARQ-related timers with respect to the HARQ process A.

M42: with respect to the HARQ process B, the corresponding cast type is groupcast, so it is necessary to maintain the HARQ-related timers no matter whether an HARQ ACK/NACK is returned by a TB, but merely the HARQ retransmission timer is maintained. A specific maintenance mechanism for the timer will be described as follows.

M421: in the case that the data transmission is performed by the UE, the UE maintains the timers corresponding to the HARQ process as follows.

After the UE for sidelink has transmitted the PSSCH (after first repetition when the PSSCH supports repetition), the HARQ RTT timer corresponding to the PSSCH is started.

M422: in the case that the data reception is performed by the UE, the UE maintains the timers corresponding to the HARQ process as follows.

The HARQ RTT timer corresponding to the process is started after the UE has received the PSSCH.

M43: with respect to the HARQ process C, the corresponding cast type is unicast, so it is necessary to maintain the HARQ-related timers with respect to the HARQ process C. A specific maintenance mechanism for the HARQ-related timers will be described as follows.

M431: in the case that the data transmission is performed by the UE, the UE maintains the timers corresponding to the HARQ process as follows.

After the UE for sidelink has transmitted the PSSCH (after first repetition when the PSSCH supports repetition), the HARQ retransmission timer corresponding to the process is started.

M432: in the case that the data reception is performed by the UE, the UE maintains the timers corresponding to the HARQ process as follows.

After the UE for sidelink has received the PSSCH, the HARQ retransmission timer corresponding to the process is started.

It should be appreciated that, according to the embodiments of the present disclosure, it is able to maintain the DRX timer related to the process at the sidelink interface, and provide the DRX mechanism for the sidelink interface, thereby to reduce the power consumption at the sidelink interface.

Figure 5:
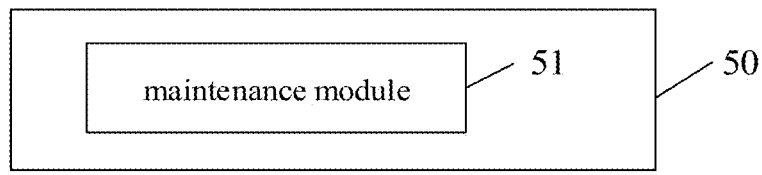
FIG. 5 is a schematic view showing modules of a UE according to one embodiment of the present disclosure.

As shown in FIG. 5, the present disclosure provides in some embodiments a UE 50, which includes a maintenance module 51 configured to, with respect to a sidelink interface, manage a timer corresponding to a first HARQ process in accordance with a cast type corresponding to the first HARQ process.

In a possible embodiment of the present disclosure, in the case that the cast type is broadcast, the maintenance module 51 is further configured to not maintain the timer corresponding to the first HARQ process.

In a possible embodiment of the present disclosure, in the case that the cast type is groupcast or unicast, the maintenance module 51 is further configured to perform one of: not maintaining the timer corresponding to the first HARQ process; maintaining the timer corresponding to the first HARQ process when a TB corresponding to the first HARQ process needs to perform HARQ feedback, otherwise not maintain the timer corresponding to the first HARQ process; or maintain the timer corresponding to the first HARQ process.

In a possible embodiment of the present disclosure, in the case that the cast type is groupcast and data transmission is performed by the UE using the first HARQ process, when maintaining the timer corresponding to the first HARQ process when the TB corresponding to the first HARQ process needs to perform the HARQ feedback, the maintenance module is further configured to perform one of: starting an HARQ round-trip time timer corresponding to the first HARQ process corresponding to a PSSCH after the UE has transmitted the PSSCH, and when at least one HARQ feedback received by the UE from the other UE with respect to the first HARQ process is an HARQ NACK when the HARQ round-trip time timer expires, starting an HARQ retransmission timer corresponding to the first HARQ process after the HARQ round-trip time timer corresponding to the first HARQ process expires; or starting the HARQ round-trip time timer corresponding to the first HARQ process after the UE has transmitted the PSSCH, and starting the HARQ retransmission timer corresponding to the first HARQ process after the HARQ round-trip time timer corresponding to the first HARQ process expires.

In a possible embodiment of the present disclosure, in the case that the cast type is groupcast and data reception is performed by the UE using the first HARQ process, when maintaining the timer corresponding to the first HARQ process when the TB corresponding to the first HARQ process needs to perform the HARQ feedback, the maintenance module is further configured to perform one of: starting an HARQ round-trip time timer corresponding to the first HARQ process after the UE has received data carried in the first HARQ process and has performed the HARQ feedback, and when the HARQ feedback corresponding to the first HARQ process is an HARQ NACK, starting an HARQ retransmission timer corresponding to the first HARQ process after the HARQ round-trip time timer corresponding to the first HARQ process expires; or starting the HARQ round-trip time timer corresponding to the first HARQ process after the UE has received the data carried in the first HARQ process and has performed the HARQ feedback, and starting the HARQ retransmission timer corresponding to the first HARQ process after the HARQ round-trip time timer corresponding to the first HARQ process expires.

In a possible embodiment of the present disclosure, in the case that the UE starts the HARQ round-trip time timer corresponding to the first HARQ process after the UE has received the data carried in the first HARQ process and performs the HARQ feedback and the UE starts the HARQ retransmission timer corresponding to the first HARQ process after the HARQ round-trip time timer corresponding to the first HARQ process expires, the UE further includes a stopping module configured to stop the HARQ retransmission timer when the UE fails to receive retransmission schedule with respect to the first HARQ process within a first predetermined time T during the operation of the HARQ retransmission timer, and the first predetermined time T is smaller than a timing length of the HARQ retransmission timer.

In a possible embodiment of the present disclosure, in the case that the cast type is unicast and data transmission is performed by the UE using the first HARQ process, when maintaining the timer corresponding to the first HARQ process when the TB corresponding to the first HARQ process needs to perform the HARQ feedback, the maintenance module is further configured to start an HARQ round-trip time timer corresponding to the first HARQ process corresponding to a PSSCH after the UE has transmitted the PSSCH, and when an HARQ feedback received by the UE from a unicast correspondent node with respect to the first HARQ process is an HARQ NACK when the HARQ round-trip time timer expires, start an HARQ retransmission timer corresponding to the first HARQ process after the HARQ round-trip time timer corresponding to the first HARQ process expires.

In a possible embodiment of the present disclosure, in the case that the cast type is unicast and data reception is performed by the UE using the first HARQ process, when maintaining the timer corresponding to the first HARQ process when the TB corresponding to the HARQ process needs to perform the HARQ feedback, the maintenance module is further configured to start an HARQ round-trip time timer corresponding to the first HARQ process after the UE has received data carried in the first HARQ process and has performed the HARQ feedback, and when the HARQ feedback corresponding to the first HARQ process is an HARQ NACK, start an HARQ retransmission timer corresponding to the first HARQ process after the HARQ round-trip time timer corresponding to the first HARQ process expires.

In a possible embodiment of the present disclosure, when maintaining the timer corresponding to the first HARQ process in the case that the data transmission is performed by the UE using the first HARQ process, the maintenance module is further configured to start an HARQ retransmission timer corresponding to the first HARQ process corresponding to a PSSCH after the UE has transmitted the PSSCH.

In a possible embodiment of the present disclosure, when maintaining the timer corresponding to the first HARQ process in the case that the data reception is performed by the UE using the first HARQ process, the maintenance module is further configured to start an HARQ retransmission timer corresponding to the first HARQ process after the UE has received data carried in the first HARQ process.

It should be appreciated that, the UE is used to implement the above-mentioned method, and all implementation modes in the method embodiments may be applied to the UE embodiments with a same technical effect.

Figure 6:
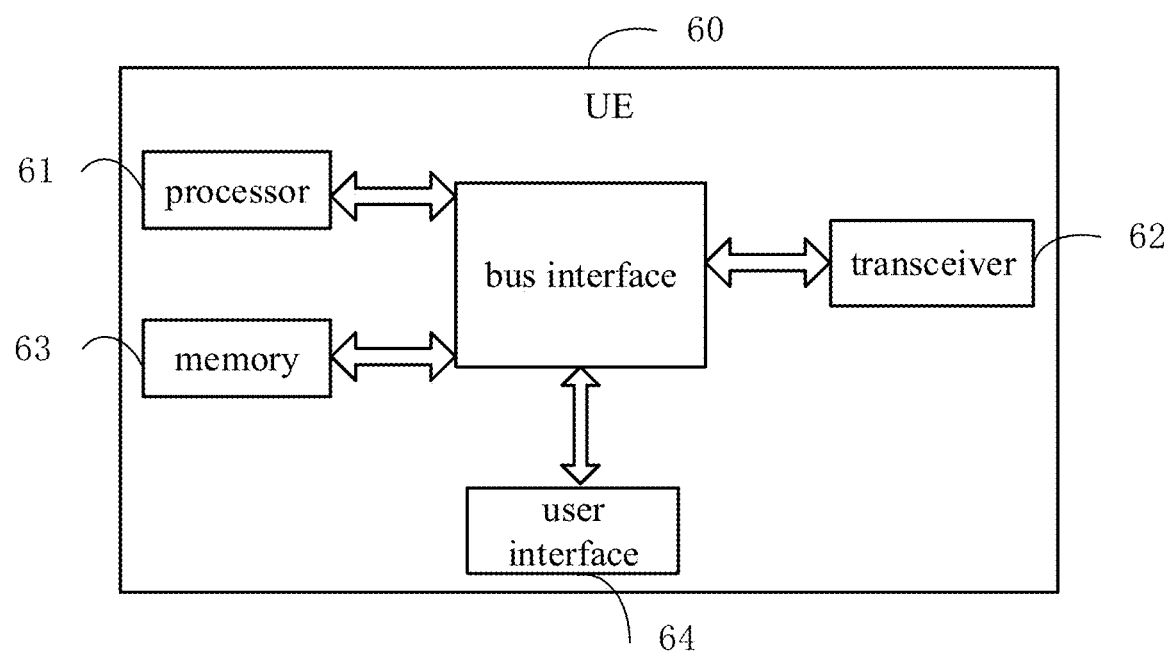
FIG. 6 is a block diagram of the UE according to one embodiment of the present disclosure.

As shown in FIG. 6, the present disclosure further provides in some embodiments a UE 60, which includes a processor 61, a transceiver 62, a memory 63, and a program stored in the memory 63 and executed by the processor 61. The transceiver 62 is coupled to the processor 61 and the memory 63 through a bus interface. The processor 61 is configured to read the program in the memory, so as to, with respect to a sidelink interface, managing a timer corresponding to a first HARQ process in accordance with a cast type corresponding to the first HARQ process.

It should be appreciated that, in FIG. 6, bus architecture may include a number of buses and bridges connected to each other, so as to connect various circuits for one or more processors 61 and one or more memories 63. In addition, as is known in the art, the bus architecture may be used to connect any other circuits, such as a circuit for a peripheral device, a circuit for a voltage stabilizer and a power maintenance circuit. The bus interface may be provided, and the transceiver 62 may consist of a plurality of elements, i.e., a transmitter and a receiver for communication with any other devices over a transmission medium. With respect to different UEs, a user interface 64 may also be provided for devices which are to be arranged inside or outside the UE, and these devices may include but not limited to a keypad, a display, a speaker, a microphone and a joystick. The processor 61 may take charge of managing the bus architecture as well as general processings. The memory 63 may store therein data for the operation of the processor 61.

In a possible embodiment of the present disclosure, in the case that the cast type is broadcast, when managing the timer corresponding to the first HARQ process in accordance with the cast type corresponding to the first HARQ process, the processor is further configured to execute the program so as to not maintain the timer corresponding to the first HARQ process.

In a possible embodiment of the present disclosure, in the case that the cast type is groupcast or unicast, when managing the timer corresponding to the first HARQ process in accordance with the cast type corresponding to the first HARQ process, the processor is further configured to execute the program so as to perform one of: not maintaining the timer corresponding to the first HARQ process; maintaining the timer corresponding to the first HARQ process when a TB corresponding to the first HARQ process needs to perform HARQ feedback, otherwise not maintaining the timer corresponding to the first HARQ process; or maintaining the timer corresponding to the first HARQ process.

In a possible embodiment of the present disclosure, in the case that the cast type is groupcast and data transmission is performed by the UE using the first HARQ process, when maintaining the timer corresponding to the first HARQ process when the TB corresponding to the first HARQ process needs to perform the HARQ feedback, the processor is further configured to execute the program so as to perform one of: starting an HARQ round-trip time timer corresponding to the first HARQ process corresponding to a PSSCH after the UE has transmitted the PSSCH, and when at least one HARQ feedback received by the UE from the other UE with respect to the first HARQ process is an HARQ NACK when the HARQ round-trip time timer expires, starting an HARQ retransmission timer corresponding to the first HARQ process after the HARQ round-trip time timer corresponding to the first HARQ process expires; or starting the HARQ round-trip time timer corresponding to the first HARQ process after the UE has transmitted the PSSCH, and starting the HARQ retransmission timer corresponding to the first HARQ process after the HARQ round-trip time timer corresponding to the first HARQ process expires.

In a possible embodiment of the present disclosure, in the case that the cast type is groupcast and data reception is performed by the UE using the first HARQ process, when maintaining the timer corresponding to the first HARQ process when the TB corresponding to the first HARQ process needs to perform the HARQ feedback, the processor is further configured to execute the program so as to perform one of: starting an HARQ round-trip time timer corresponding to the first HARQ process after the UE has received data carried in the first HARQ process and has performed the HARQ feedback, and when the HARQ feedback corresponding to the first HARQ process is an HARQ NACK, starting an HARQ retransmission timer corresponding to the first HARQ process after the HARQ round-trip time timer corresponding to the first HARQ process expires; or starting the HARQ round-trip time timer corresponding to the first HARQ process after the UE has received the data carried in the first HARQ process and has performed the HARQ feedback, and starting the HARQ retransmission timer corresponding to the first HARQ process after the HARQ round-trip time timer corresponding to the first HARQ process expires.

In a possible embodiment of the present disclosure, in the case that the UE starts the HARQ round-trip time timer corresponding to the first HARQ process after the UE has received the data carried in the first HARQ process and performs the HARQ feedback and the UE starts the HARQ retransmission timer corresponding to the first HARQ process after the HARQ round-trip time timer corresponding to the first HARQ process expires, the processor is further configured to execute the program so as to stop the HARQ retransmission timer when the UE fails to receive retransmission schedule with respect to the first HARQ process within a first predetermined time T during the operation of the HARQ retransmission timer, and the first predetermined time T is smaller than a timing length of the HARQ retransmission timer.

In a possible embodiment of the present disclosure, in the case that the cast type is unicast and data transmission is performed by the UE using the first HARQ process, when maintaining the timer corresponding to the first HARQ process when the TB corresponding to the first HARQ process needs to perform the HARQ feedback, the processor is further configured to execute the program so as to start an HARQ round-trip time timer corresponding to the first HARQ process corresponding to a PSSCH after the UE has transmitted the PSSCH, and when an HARQ feedback received by the UE from a unicast correspondent node with respect to the first HARQ process is an HARQ NACK when the HARQ round-trip time timer expires, start an HARQ retransmission timer corresponding to the first HARQ process after the HARQ round-trip time timer corresponding to the first HARQ process expires.

In a possible embodiment of the present disclosure, in the case that the cast type is unicast and data reception is performed by the UE using the first HARQ process, when maintaining the timer corresponding to the first HARQ process when the TB corresponding to the HARQ process needs to perform the HARQ feedback, the processor is further configured to execute the program so as to start an HARQ round-trip time timer corresponding to the first HARQ process after the UE has received data carried in the first HARQ process and has performed the HARQ feedback, and when the HARQ feedback corresponding to the first HARQ process is an HARQ NACK, start an HARQ retransmission timer corresponding to the first HARQ process after the HARQ round-trip time timer corresponding to the first HARQ process expires.

In a possible embodiment of the present disclosure, when maintaining the timer corresponding to the first HARQ process in the case that the data transmission is performed by the UE using the first HARQ process, the processor is further configured to execute the program so as to start an HARQ retransmission timer corresponding to the first HARQ process corresponding to a PSSCH after the UE has transmitted the PSSCH.

In a possible embodiment of the present disclosure, when maintaining the timer corresponding to the first HARQ process in the case that the data reception is performed by the UE using the first HARQ process, the processor is further configured to execute the program so as to start an HARQ retransmission timer corresponding to the first HARQ process after the UE has received data carried in the first HARQ process.

The present disclosure further provides in some embodiments a computer-readable storage medium storing therein a computer program. The computer program is executed by a processor, so as to implement the steps of the above-mentioned DRX timer maintenance method for the UE.

It should be further appreciated that, the above modules in the network device and the UE are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A or B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Discontinuous Reception (DRX) timer maintenance method, applied for a User Equipment (UE), comprising, with respect to a sidelink interface, managing a timer corresponding to a first Hybrid Automatic Repeat reQuest (HARQ) process in accordance with a cast type corresponding to the first HARQ process;

wherein in the case that the cast type is groupcast, the managing the timer corresponding to the first HARQ process in accordance with the cast type corresponding to the first HARQ process comprises:

in the case that the cast type is groupcast and data reception is performed by the UE using the first HARQ process, the maintaining, by the UE, the timer corresponding to the first HARQ process when the Transport Block (TB) corresponding to the first HARQ process needs to perform the HARQ feedback;

wherein in the case that the cast type is groupcast and data reception is performed by the UE using the first HARQ process, the maintaining, by the UE, the timer corresponding to the first HARQ process when the TB corresponding to the first HARQ process needs to perform the HARQ feedback comprises one of:

starting, by the UE, an HARQ RTT timer corresponding to the first HARQ process after the UE has received data carried in the first HARQ process and has performed the HARQ feedback, and when the HARQ feedback corresponding to the first HARQ process is an HARQ NACK, starting, by the UE, an HARQ retransmission timer corresponding to the first HARQ process after the HARQ RTT timer corresponding to the first HARQ process expires; or starting, by the UE, the HARQ RTT timer corresponding to the first HARQ process after the UE has received the data carried in the first HARQ process and has performed the HARQ feedback, and starting, by the UE, the HARQ retransmission timer corresponding to the first HARQ process after the HARQ RTT timer corresponding to the first HARQ process expires.

2. The DRX timer maintenance method according to claim 1, wherein in the case that the cast type is broadcast, the managing the timer corresponding to the first HARQ process in accordance with the cast type corresponding to the first HARQ process comprises not maintaining, by the UE, the timer corresponding to the first HARQ process.

3. The DRX timer maintenance method according to claim 1, wherein in the case that the cast type is groupcast and data transmission is performed by the UE using the first HARQ process, the maintaining, by the UE, the timer corresponding to the first HARQ process when the TB corresponding to the first HARQ process needs to perform the HARQ feedback comprises one of:

starting, by the UE, an HARQ round-trip time (RTT) timer corresponding to the first HARQ process after the UE has transmitted the PSSCH, and when at least one HARQ feedback received by the UE from another UE with respect to the first HARQ process is an HARQ Negative Acknowledgement (NACK) when the HARQ RTT timer expires, starting, by the UE, an HARQ retransmission timer corresponding to the first HARQ process after the HARQ RTT timer corresponding to the first HARQ process expires; or starting, by the UE, the HARQ RTT timer corresponding to the first HARQ process after the UE has transmitted the PSSCH, and starting the HARQ retransmission timer corresponding to the first HARQ process after the HARQ RTT timer corresponding to the first HARQ process expires.

4. The DRX timer maintenance method according to claim 1, wherein in the case that the UE starts the HARQ RTT timer corresponding to the first HARQ process after the UE has received the data carried in the first HARQ process and performs the HARQ feedback and the UE starts the HARQ retransmission timer corresponding to the first HARQ process after the HARQ RTT timer corresponding to the first HARQ process expires, the DRX timer maintenance method further comprises:

stopping, by the UE, the HARQ retransmission timer when the UE fails to receive retransmission schedule with respect to the first HARQ process within a first predetermined time T during the operation of the HARQ retransmission timer, wherein the first predetermined time T is smaller than a timing length of the HARQ retransmission timer.

5. The DRX timer maintenance method according to claim 1, wherein in the case that the cast type is unicast and data transmission is performed by the UE using the first HARQ process, the maintaining, by the UE, the timer corresponding to the first HARQ process when the TB corresponding to the first HARQ process needs to perform the HARQ feedback comprises:

starting, by the UE, an HARQ RTT timer corresponding to the first HARQ process corresponding to a PSSCH after the UE has transmitted the PSSCH, and when an HARQ feedback received by the UE from a unicast correspondent node with respect to the first HARQ process is an HARQ NACK when the HARQ RTT timer expires, starting, by the UE, an HARQ retransmission timer corresponding to the first HARQ process after the HARQ RTT timer corresponding to the first HARQ process expires.

6. The DRX timer maintenance method according to claim 1, wherein in the case that the cast type is unicast and data reception is performed by the UE using the first HARQ process, the maintaining, by the UE, the timer corresponding to the first HARQ process when the TB corresponding to the HARQ process needs to perform the HARQ feedback comprises:

starting, by the UE, an HARQ RTT timer corresponding to the first HARQ process after the UE has received data carried in the first HARQ process and has performed the HARQ feedback, and when the HARQ feedback corresponding to the first HARQ process is an HARQ NACK, starting, by the UE, an HARQ retransmission timer corresponding to the first HARQ process after the HARQ RTT timer corresponding to the first HARQ process expires.

7. The DRX timer maintenance method according to claim 1, wherein the maintaining, by the UE, the timer corresponding to the first HARQ process in the case that the data transmission is performed by the UE using the first HARQ process comprises:
  starting, by the UE, an HARQ retransmission timer corresponding to the first HARQ process corresponding to a PSSCH after the UE has transmitted the PSSCH.

8. The DRX timer maintenance method according to claim 1, wherein the maintaining, by the UE, the timer corresponding to the first HARQ process in the case that the data reception is performed by the UE using the first HARQ process comprises:
  starting, by the UE, an HARQ retransmission timer corresponding to the first HARQ process after the UE has received data carried in the first HARQ process.

9. A UE, comprising a memory, a processor, and a program stored in the memory and executed by the processor, wherein the processor is configured to execute the program so as to, with respect to a sidelink interface, managing a timer corresponding to a first HARQ process in accordance with a cast type corresponding to the first HARQ process;
  wherein in the case that the cast type is groupcast, when managing the timer corresponding to the first HARQ process in accordance with the cast type corresponding to the first HARQ process, the processor is further configured to execute the program so as to perform:
  in the case that the cast type is groupcast and data reception is performed by the UE using the first HARQ process, when maintaining the timer corresponding to the first HARQ process when the TB corresponding to the first HARQ process needs to perform the HARQ feedback;
  wherein in the case that the cast type is groupcast and data reception is performed by the UE using the first HARQ process, when maintaining the timer corresponding to the first HARQ process when the TB corresponding to the first HARQ process needs to perform the HARQ feedback, the processor is further configured to execute the program so as to perform one of:
  starting an HARQ RTT timer corresponding to the first HARQ process after the UE has received data carried in the first HARQ process and has performed the HARQ feedback, and when the HARQ feedback corresponding to the first HARQ process is an HARQ NACK, starting an HARQ retransmission timer corresponding to the first HARQ process after the HARQ RTT timer corresponding to the first HARQ process expires; or
  starting the HARQ RTT timer corresponding to the first HARQ process after the UE has received the data carried in the first HARQ process and has performed the HARQ feedback, and starting the HARQ retransmission timer corresponding to the first HARQ process after the HARQ RTT timer corresponding to the first HARQ process expires.

10. The UE according to claim 9, wherein in the case that the cast type is broadcast, when managing the timer corresponding to the first HARQ process in accordance with the cast type corresponding to the first HARQ process, the processor is further configured to execute the program so as to not maintain the timer corresponding to the first HARQ process.

11. The UE according to claim 9, wherein in the case that the cast type is groupcast and data transmission is performed by the UE using the first HARQ process, when maintaining the timer corresponding to the first HARQ process when the TB corresponding to the first HARQ process needs to perform the HARQ feedback, the processor is further configured to execute the program so as to perform one of:
  starting an HARQ RTT timer corresponding to the first HARQ process corresponding to a PSSCH after the UE has transmitted the PSSCH, and when at least one HARQ feedback received by the UE from another UE with respect to the first HARQ process is an HARQ NACK when the HARQ RTT timer expires, starting an HARQ retransmission timer corresponding to the first HARQ process after the HARQ RTT timer corresponding to the first HARQ process expires; or
  starting the HARQ RTT timer corresponding to the first HARQ process after the UE has transmitted the PSSCH, and starting the HARQ retransmission timer corresponding to the first HARQ process after the HARQ RTT timer corresponding to the first HARQ process expires.

12. The UE according to claim 9, wherein in the case that the UE starts the HARQ RTT timer corresponding to the first HARQ process after the UE has received the data carried in the first HARQ process and performs the HARQ feedback and the UE starts the HARQ retransmission timer corresponding to the first HARQ process after the HARQ RTT timer corresponding to the first HARQ process expires, the processor is further configured to execute the program so as to stop the HARQ retransmission timer when the UE fails to receive retransmission schedule with respect to the first HARQ process within a first predetermined time T during the operation of the HARQ retransmission timer,
  wherein the first predetermined time T is smaller than a timing length of the HARQ retransmission timer.

13. The UE according to claim 9, wherein in the case that the cast type is unicast and data transmission is performed by the UE using the first HARQ process, when maintaining the timer corresponding to the first HARQ process when the TB corresponding to the first HARQ process needs to perform the HARQ feedback, the processor is further configured to execute the program so as to start an HARQ RTT timer corresponding to the first HARQ process corresponding to a PSSCH after the UE has transmitted the PSSCH, and when an HARQ feedback received by the UE from a unicast correspondent node with respect to the first HARQ process is an HARQ NACK when the HARQ RTT timer expires, start an HARQ retransmission timer corresponding to the first HARQ process after the HARQ RTT timer corresponding to the first HARQ process expires.

14. The UE according to claim 9, wherein in the case that the cast type is unicast and data reception is performed by the UE using the first HARQ process, when maintaining the timer corresponding to the first HARQ process when the TB corresponding to the HARQ process needs to perform the HARQ feedback, the processor is further configured to execute the program so as to start an HARQ RTT timer corresponding to the first HARQ process after the UE has received data carried in the first HARQ process and has performed the HARQ feedback, and when the HARQ feedback corresponding to the first HARQ process is an HARQ NACK, start an HARQ retransmission timer corresponding to the first HARQ process after the HARQ RTT timer corresponding to the first HARQ process expires.

15. The UE according to claim 9, wherein when maintaining the timer corresponding to the first HARQ process in the case that the data transmission is performed by the UE using the first HARQ process, the processor is further configured to execute the program so as to start an HARQ retransmission timer corresponding to the first HARQ process corresponding to a PSSCH after the UE has transmitted the PSSCH.

16. The UE according to claim 9, wherein when maintaining the timer corresponding to the first HARQ process in the case that the data reception is performed by the UE using the first HARQ process, the processor is further configured to execute the program so as to start an HARQ retransmission timer corresponding to the first HARQ process after the UE has received data carried in the first HARQ process.

* * * * *